US011338314B2

(12) United States Patent
Fukaya et al.

(10) Patent No.: US 11,338,314 B2
(45) Date of Patent: May 24, 2022

(54) NOZZLE DEVICE AND NOZZLE UNIT

(71) Applicant: Ihara Science Corporation, Tokyo (JP)

(72) Inventors: Shinji Fukaya, Tokyo (JP); Hideichi Tsuboi, Tokyo (JP)

(73) Assignee: Ihara Science Corporation, Tokyo (JP)

( * ) Notice: Subject to any disclaimer, the term of this patent is extended or adjusted under 35 U.S.C. 154(b) by 149 days.

(21) Appl. No.: 16/488,877

(22) PCT Filed: Feb. 21, 2018

(86) PCT No.: PCT/JP2018/006224
§ 371 (c)(1),
(2) Date: Aug. 26, 2019

(87) PCT Pub. No.: WO2018/155493
PCT Pub. Date: Aug. 30, 2018

(65) Prior Publication Data

US 2020/0023400 A1 Jan. 23, 2020

(30) Foreign Application Priority Data

Feb. 27, 2017 (JP) ............................ JP2017-035052

(51) Int. Cl.
*B05B 15/652* (2018.01)
*B23Q 11/10* (2006.01)
(Continued)

(52) U.S. Cl.
CPC ............ *B05B 15/652* (2018.02); *B05B 1/185* (2013.01); *B05B 1/20* (2013.01); *B23Q 11/10* (2013.01); *F16J 15/10* (2013.01)

(58) Field of Classification Search
CPC ........... B05B 15/652; B05B 1/14; B05B 1/20; B05B 1/185; B05B 1/302; B05B 1/3026; B23Q 11/10; F16J 15/10; Y10S 239/04
(Continued)

(56) References Cited

U.S. PATENT DOCUMENTS 4,221,336 A * 9/1980 Diamond ............ A61H 33/027 239/587.4
4,717,078 A * 1/1988 Arp ...................... F16L 27/047 239/587.4
(Continued)

FOREIGN PATENT DOCUMENTS

CN 201692914 1/2011
CN 202541803 11/2012
(Continued)

OTHER PUBLICATIONS

Chinese Office Action in CN Application 201880013722.7, dated Aug. 25, 2020.

*Primary Examiner* — Steven J Ganey
(74) *Attorney, Agent, or Firm* — DLA Piper LLP US

(57) ABSTRACT

In order to enable the outflow direction of a fluid to be changed and to enable the outflow position of the fluid to be freely set, a nozzle device (7) of the present invention comprising: a flow path body that flows or holds a fluid and that has a flow path wall (6); and a nozzle unit (1) including a nozzle body (3) having a spherical surface on an outer periphery thereof and having a fluid passage (3*a*) formed thereinside, a holding mechanism of the nozzle body (3), and a securing member (4) that fixes the holding mechanism to the flow path wall (6), wherein the holding mechanism is made of a pair of thin plate members (2), each having a contact holding portion (2*b*) in contact with the spherical surface of the nozzle body (3) and having a flat portion (2*a*), and the holding mechanism rotatably holds the spherical surface in a state in which the nozzle body (3) is sandwiched by the contact holding portions (2*b*) of a pair of the thin plate members (2).

13 Claims, 12 Drawing Sheets

(51) Int. Cl.
*B05B 1/20* (2006.01)
*B05B 1/18* (2006.01)
*F16J 15/10* (2006.01)

(58) Field of Classification Search
USPC ............ 239/548, 550, 537, 538, 566, 587.1, 239/587.3, 587.4, 596, 600
See application file for complete search history.

(56) References Cited

U.S. PATENT DOCUMENTS

| | | | | | |
|---|---|---|---|---|---|
| 5,076,500 | A | * | 12/1991 | Daniels .............. | A61H 33/6063 239/587.4 |
| 5,713,524 | A | * | 2/1998 | Greene .................. | A62C 35/68 239/596 |
| 5,730,370 | A | * | 3/1998 | Bowen .................. | B05B 15/654 239/587.3 |
| 2007/0290078 | A1 | | 12/2007 | Green | |

FOREIGN PATENT DOCUMENTS

| | | |
|---|---|---|
| CN | 202752143 | 2/2013 |
| CN | 202860750 | 4/2013 |
| CN | 103895612 | 7/2014 |
| CN | 205236225 | 5/2016 |
| JP | S63-013276 | 1/1988 |
| JP | S63-053646 | 4/1988 |
| JP | H05-272654 | 10/1993 |
| JP | H07-031206 | 6/1995 |
| JP | 2008-036810 | 2/2008 |
| JP | 51-89541 | 4/2014 |

* cited by examiner

NOZZLE DEVICE AND NOZZLE UNIT

CROSS REFERENCE TO RELATED APPLICATIONS

This application is a U.S. National Stage Application of International Application No. PCT/JP2018/006224 filed Feb. 21, 2018, which claims priority from Japanese Patent Application No. 2017-035052 filed Feb. 27, 2017. The entirety of all the above-listed applications are incorporated herein by reference.

TECHNICAL FIELD

The present invention relates to a nozzle device and a nozzle unit which are used to enable to outflow a fluid such as a liquid.

BACKGROUND ART

In order to enable a fluid, such as a liquid, to flow out of a housing or a piping to the outside, a nozzle device is conventionally incorporated in the housing or the piping. Thus, it is desirable that the direction of the passage through which a fluid flows can be changed inside the nozzle device so that the outflow direction of a fluid can be easily set based upon use application of the outflowing fluid, the arrangement position of the housing and the piping, and the like. For this reason, according to the invention described in Patent Document 1, a spherical body integral with a pipe member is rotatably held by the housing. According to the invention described in Patent Document 2, a nozzle body having a spherical surface portion is held in a space formed by a joint body and a tightening nut.

PRIOR ART DOCUMENTS

Patent Documents

Patent Document 1: JP05-272654A
Patent Document 2: JP2008-36810A

SUMMARY OF INVENTION

Problem to Be Solved by the Invention

In the inventions described in Patent Documents 1 and 2, it is possible to move a pipe member (nozzle body) in a relatively free manner by using a spherical body (spherical surface portion). As a result, it is easy to change the fluid outflow direction. However, a relatively large space is needed to hold the spherical body (spherical surface portion). In order to form the large space, a large housing (an assembly of a joint body and a tightening nut) is required. Therefore, it is necessary to secure a mounting space for incorporating the nozzle device, that is, a sufficiently large space for accommodating a large housing, in a part of the housing to hold the fluid and the piping through which the fluid flows. The above constraints restrict the arrangement position of the nozzle device, that is, the fluid outflow position, and thus prevent the fluid from freely flowing out from any position of the housing or the piping.

According to the invention described in Patent Document 1, the housing that holds the spherical body includes a locking portion (male thread portion) that has larger diameter than a fluid passage. According to the invention described in Patent Document 2, the entire nozzle constitutes a male thread portion that is larger than the size of the nozzle body. Therefore, in the structure described in Patent Documents 1 and 2, the housing and the piping must include a female thread portion that is large enough to receive the large male thread portion. It is not easy to form such a female thread portion in thin piping (pipes) in view of space and strength. Thus, it is possible to mount the nozzle only at the portion having a certain level of strength and size where a large female thread portion can be formed and a large housing can be supported. Only such a portion can be used as the fluid outflow position from which the fluid flows out. In other words, the nozzle device that can change the fluid outflow direction in a free and easy manner is restricted in the mounting position in the piping and the like. Furthermore, it is difficult to achieve the structure which can change the fluid outflow direction in a free and easy manner and can also set the fluid outflow position in a free manner in the piping or the like.

Accordingly, an object of the present invention is to provide a nozzle device and a nozzle unit that can change a fluid outflow direction in a relatively free and easy manner and can set an outflow position of the fluid in a relatively free manner.

Means to Solve the Problem

A nozzle device of the present invention comprises: a flow path body that flows or holds a fluid and that has a flow path wall; and a nozzle unit including a nozzle body having a spherical surface on an outer periphery thereof and having a fluid passage formed thereinside, a holding mechanism of the nozzle body, and a securing member that fixes the holding mechanism to said flow path wall, wherein the holding mechanism is made of a pair of thin plate members, each having a contact holding portion in contact with the spherical surface of the nozzle body and having a flat portion, and the holding mechanism rotatably holds the spherical surface in a state in which the nozzle body is sandwiched by the contact holding portions of a pair of the thin plate members.

Advantageous Effects of Invention

According to the present invention, it is possible to change a fluid outflow direction in a relatively free and easy manner and to set the fluid outflow position in a relatively free manner.

DESCRIPTION OF EMBODIMENTS

Hereinafter, embodiments of the present invention will be described.

Figure 1A:
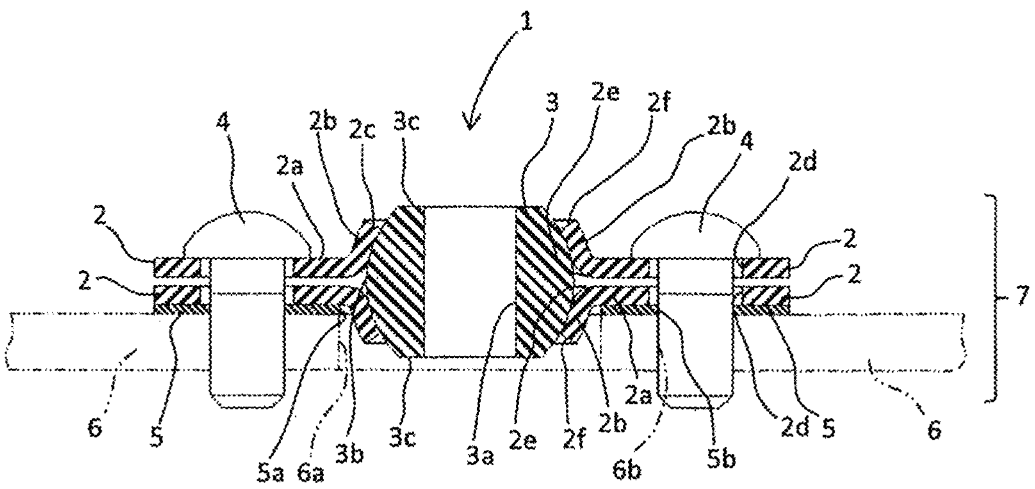
FIG. 1A is a cross-sectional view illustrating a nozzle device of a first embodiment of the present invention.
Figure 1B:
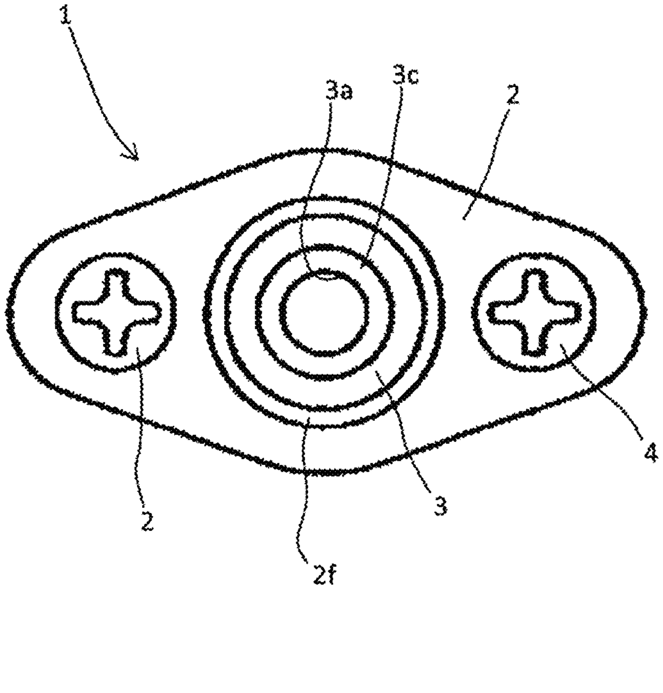
FIG. 1B is a plan view of the nozzle device.
Figure 2:
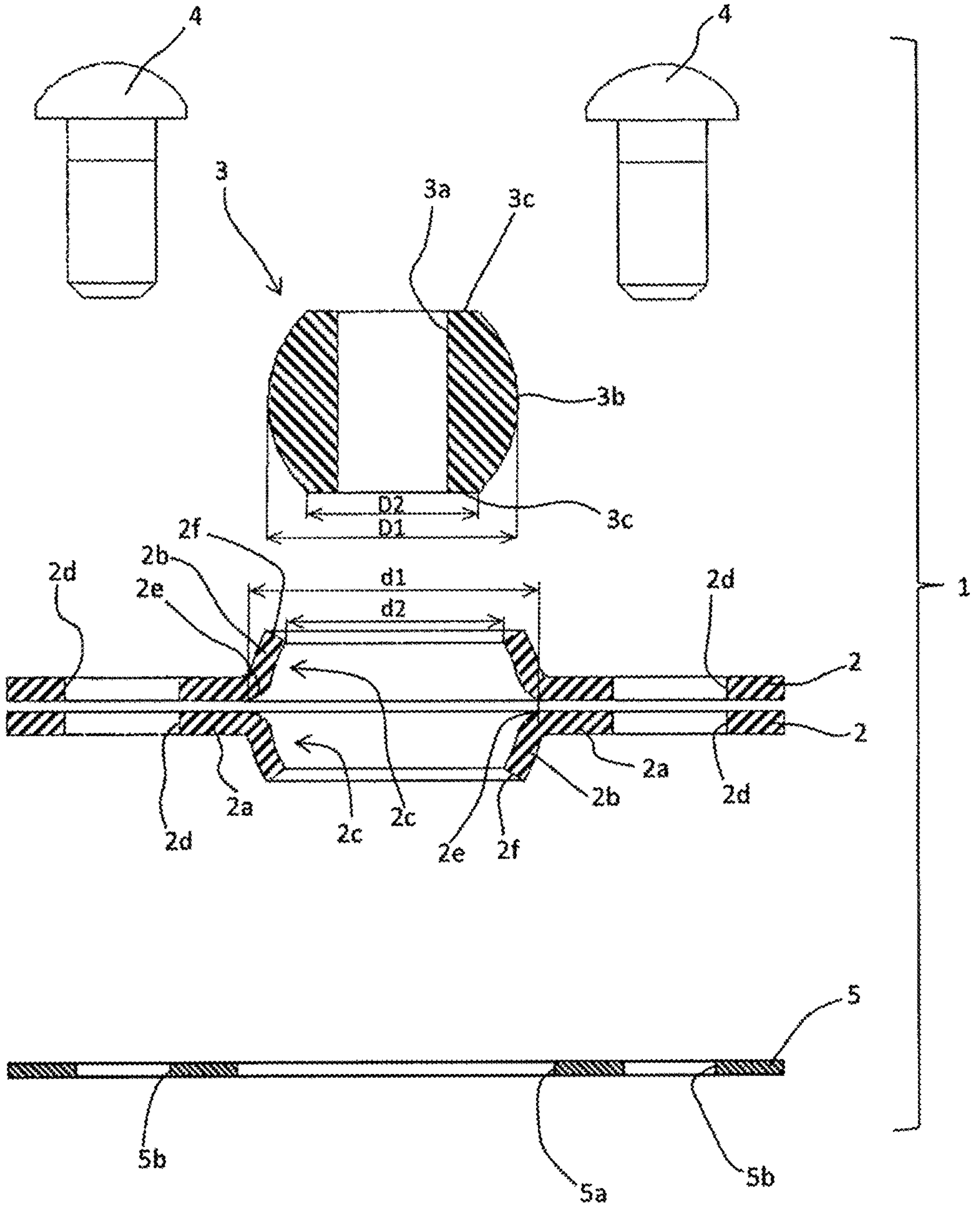
FIG. 2 is an exploded view of a nozzle unit of the nozzle device illustrated in FIGS. 1A and 1B.

Nozzle device 7 of a first embodiment of the present invention illustrated in FIGS. 1A, 1B and 2 includes nozzle unit 1 and a flow path body having nozzle unit 1 attached thereto. Nozzle unit 1 includes pair of thin plate members 2, nozzle body 3, screw 4 that is an example of a securing member, and gasket 5. Each thin plate member 2 includes flat portion 2*a*, contact holding portion 2*b* that is formed by being bent from flat portion 2*a*, hollow portion 2*c* (see FIG. 2) of contact holding portion 2*b* that is tapered away from flat portion 2*a*, and at least two fixing holes 2*d* provided outside contact holding portion 2*b*. Pair of thin plate members 2 are disposed so as to substantially overlap with each other with or without a space therebetween. In this state, hollow portions 2*c* substantially overlap with each other to constitute a holding space. Contact holding portion 2*b* is bent from flat portion 2*a* of thin plate member 2 and extends substantially in a thickness direction of flat portion 2*a* toward an opposite side to a surface where flat portions 2*a* face each other. As illustrated in FIG. 2, contact holding portion 2*b* has a tapered shape where inner diameter d2 of hollow portion 2*c* of distal end portion 2*f* is smaller than inner diameter d1 of hollow portion 2*c* of root portion 2*e* (connection portion between contact holding portion 2*b* and flat portion 2*a*). Therefore, the portion of contact holding portion 2*b* which is bent from flat portion 2*a* of thin plate member 2 extends in the thickness direction of flat portion 2*a* and in a direction toward the center of hollow portion 2*c*.

Nozzle body 3 of the present embodiment is held in a holding space and includes fluid passage 3*a* that is a through hole. The holding space is formed by connecting hollow portions 2*c* of contact holding portions 2*a* of pair of thin plate members 2. As illustrated in the drawing, nozzle body 3 has the shape in which the outer peripheral portion forms a part of a spherical surface. The shape of nozzle body 3 may be formed by cutting the upper and lower end portions of the spherical body and has a short size in an up-and-down direction, so that nozzle body 3 is flattened. The outer diameter decreases from maximum outer diameter portion 3*b*, which is located substantially at the center in a longitudinal direction of fluid passage 3*a*, toward both end portions 3*c* in the longitudinal direction of fluid passage 3*a*. Specifically, outer diameter D1 of maximum outer diameter portion 3*b* is larger than outer diameter D2 of both end portions 3*c*, smaller than inner diameter d1 of hollow portion 2*c* of root portion 2*e* of contact holding portion 2*b*, and larger than inner diameter d2 of hollow portion 2*c* of distal end portion 2*f*. Therefore, in an assembled state (FIG. 1A), nozzle body 3 cannot be detached from hollow portion 2*c* of contact holding portion 2*b*. As a result, nozzle body 3 is inserted into a holding space formed by connecting hollow portions 2*c*, and nozzle body 3 is rotatably held in a state in which maximum outer diameter portion 3*b* is positioned inside the holding space. By rotating nozzle body 3 inside the holding space, it is possible to change the direction of fluid passage 3*a* and to change the outflow direction of the fluid from nozzle unit 1. Preferably, nozzle body 3 is not detachable from the holding space. As described above, pair of thin plate members 2 constitute a holding mechanism of nozzle body 3.

Gasket 5 is sandwiched between a pair of substantially overlapping thin plate members 2 and flow path wall 6 (virtually illustrated by a two-dot chain line in FIG. 1A) of the flow path body to which nozzle unit 1 is attached. Gasket 5 is made of an elastic material such as rubber. Gasket 5 has substantially the same outer peripheral contour of planar shape as the outer peripheral contour of planar shape of flat portion 2*a* of thin plate member 2. Gasket 5 includes central hole 5*a* through which contact holding portion 2*b* can pass, and fixing holes 5*b* each facing fixing hole 2*d*. However, if high level of sealing performance is not required, gasket 5 may be omitted.

Screw 4, which is an example of the securing member, passes through mutually overlapping fixing holes 2*d* and 5*b* of pair of overlapping thin plate members 2 and gasket 5, and screw 4 is threaded into and fixed to flow path wall 6.

Specifically, pair of thin plate members 2 are disposed at positions that cover hole portion 6*a* in flow path wall 6 of the flow path body, and gasket 5 is located between the pair of thin plate members 2 and flow path wall 6. Screw 4 passing through substantially overlapping fixing holes 2*d* and 5*b* is threaded into and fixed to threaded hole 6*b* provided outside hole portion 6*a* of flow path wall 6. In this manner, by threading screw 4 into threaded hole 6*b*, pair of thin plate members 2 are fixed to flow path wall 6 with gasket 5 interposed therebetween. Then, nozzle body 3 is rotatably held in a holding space of thin plate members 2 due to the difference between outer diameter D1 of maximum outer diameter portion 3*b*, and inner diameters d1, d2 of root portion 2*e* and distal end portion 2*f* of hollow portion 2*c* of contact holding portion 2*b* of thin plate member 2. Therefore, the direction of fluid passage 3*a*, that is, the fluid outflow direction can be freely changed by rotating nozzle body 3 inside the holding space of thin plate members 2 which are fixed to flow path wall 6 of the flow path body.

Figure 3A:
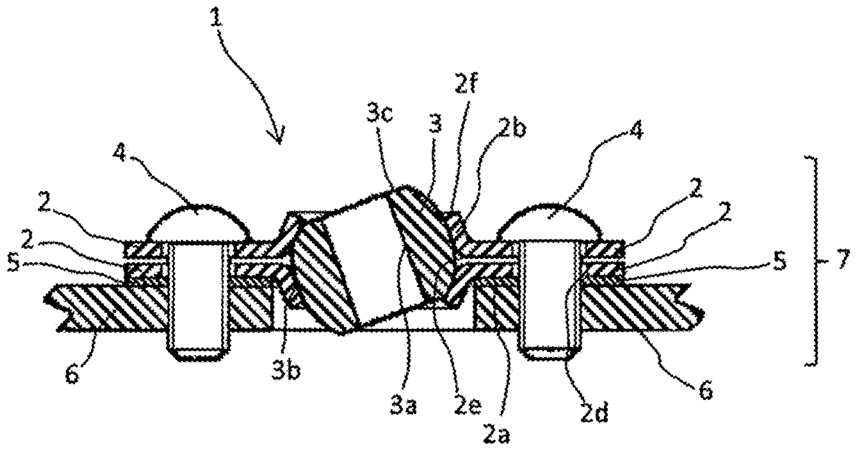
FIGS. 3A and 3B each are cross-sectional views illustrating a state in which an outflow direction of the nozzle unit illustrated in FIG. 2 is changed.
Figure 3B:
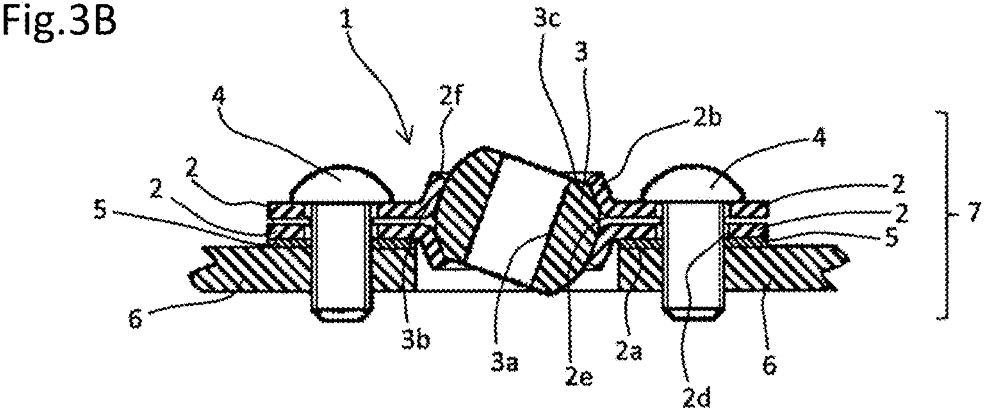

FIG. 3A illustrates an example in which the fluid outflow direction is inclined to the left in the drawing. FIG. 3B illustrates an example in which the fluid outflow direction is inclined to the right in the drawing. In this manner, nozzle body 3 is rotatable inside the holding space while the spherical surface on an outer periphery of nozzle body 3 is sliding along an inner surface of contact holding portion 2*b* of thin plate member 2. Nozzle body 3 can be rotated 360 degrees in a plane parallel to flat portion 2*a* of thin plate member 2. In the thickness direction of flat portion 2*a* of thin plate member 2, as illustrated in FIGS. 3A and 3B, nozzle body 3 can be inclined as long as nozzle body 3 is not detached from distal end portion 2*f* of hollow portion 2*c* of holding contact portion 2*b* of thin plate member 2. When the outer peripheral portion of nozzle body 3 and an inner peripheral portion of contact holding portion 2*b* of thin plate member 2 are formed with high accuracy, they are in close contact with each other to generate a frictional force. Due to the frictional force, nozzle body 3 which has been moved to a position can be continuously held at that position. In this case, nozzle body 3 can be rotated again to change again the outflow position and the outflow direction of the fluid by applying an external force, for example, by manually rotating nozzle body 3. Easily moving of nozzle body 3 in the holding space and the prevention of unintended positional shift of nozzle body 3 which has been moved to a position, are contradictory requirements. The balance between the requirements is appropriately set by appropriately adjusting the degree of tightening of screw 4 to adjust the distance between both thin plate members 2. At this time, nozzle body 3 may be sandwiched by contact holding portions 2*b* of pair of thin plate members 2 while being pressed with a predetermined pressure and may be rotatably held. Alternatively, nozzle body 3 may be sandwiched by contact holding portion 2*b* without being pressed and may be rotatably held.

Nozzle unit 1 of the present invention can be attached to flow path wall 6 of the flow path body such as a pipe simply by fixing pair of thin plate members 2 by screw 4. A large housing as in the inventions described in Patent Documents 1 and 2 is not required, and nozzle body 3 can be rotatably held only by contact holding portions 2*b* formed by bending a part of thin plate member 2. Thus, the overall size of nozzle unit 1, particularly the dimension in a direction vertical to flow path wall 6 (in a thickness direction of flat portion 2*a* of thin plate member 2) can be kept very small. Nozzle unit 1 having a small size is light, and thus flow path wall 6 does not require a large space and high strength. As a result, there is a very small restriction on the mounting position of nozzle unit 1, that is, the fluid outflow position. Therefore, it is possible to greatly improve freedom in arranging the mounting position (outflow position).

Figure 4A:
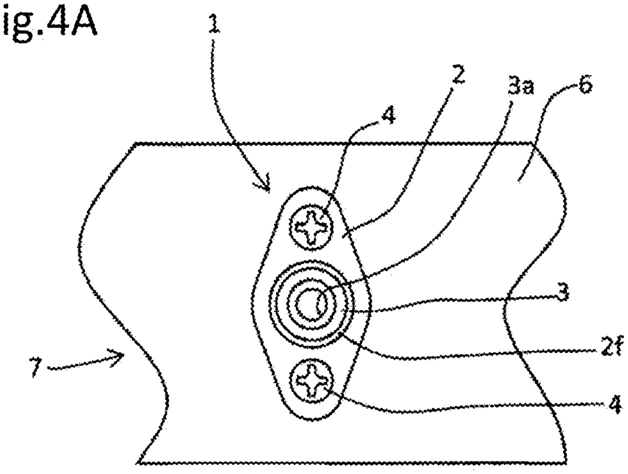
FIGS. 4A and 4B are a plan view and a cross-sectional view illustrating the nozzle device having a structure in which the nozzle unit illustrated in FIG. 2 is attached to a pipe having a square cross section.
Figure 4B:
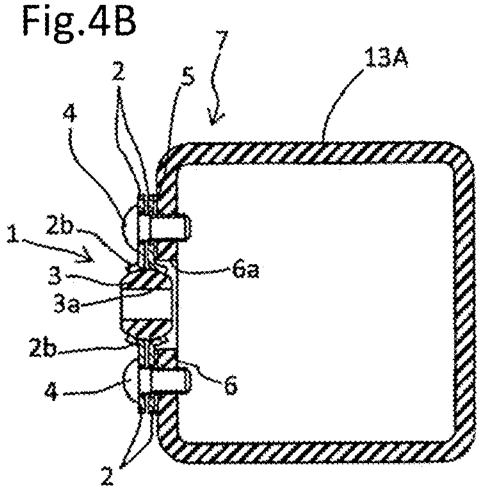
Figure 4C:
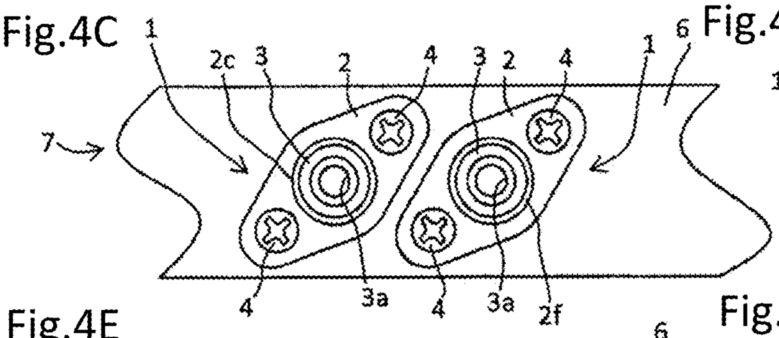
FIGS. 4C and 4D are a plan view and a cross-sectional view illustrating the nozzle device having a structure in which the nozzle unit illustrated in FIG. 2 is attached to a pipe having a small square cross section.
Figure 4D:
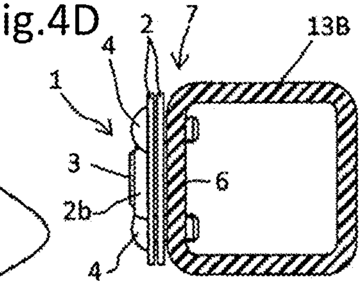

As illustrated in FIG. 1B, flat portion 2*a* of thin plate member 2 of nozzle unit 1 and gasket 5 of the present embodiment have a substantially parallelogram planar shape that is long in one direction and short in a direction orthogonal thereto. FIGS. 4A and 4B illustrate nozzle device 7 having a structure in which nozzle unit 1 is attached to pipe 13A (flow path body) having a square cross section. Further, FIGS. 4C and 4D illustrate a state in which nozzle unit 1 of the present embodiment is attached to pipe 13B (flow path body) having the smaller square cross section. As described above, when the length of one side of a square cross section of pipe 13B is shorter than a long side of a planar shape of flat portion 2*a* of thin plate member 2 and gasket 5, nozzle unit 1 can be obliquely attached such that the long sides of flat portion 2*a* of thin plate member 2 and gasket 5 are inclined relative to a direction in which pipe 13B extends. In particular, when a plurality of nozzle units 1 are attached to one pipe 13B, the pitch of fluid passage 3*a* (outflow position) of nozzle unit 1 can be reduced. The reduction of the pitch can be achieved by arranging nozzle unit 1 such that the long sides of flat portion 2*a* of thin plate member 2 and gasket 5 are inclined relative to the direction in which pipe 13B extends. Furthermore, although not illustrated, when the pipe is smaller, nozzle unit 1 can be attached such that the direction in which the pipe extends is parallel to the long sides of flat portion 2*a* of thin plate member 2 and gasket 5.

Figure 4E:
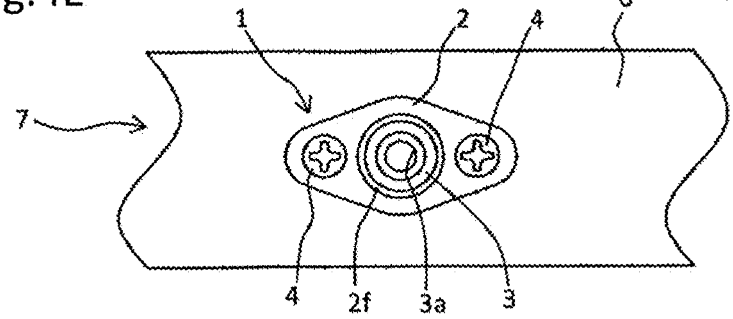
FIGS. 4E and 4F are a plan view and a cross-sectional view illustrating the nozzle device having a structure in which the nozzle unit illustrated in FIG. 2 is attached to a pipe having a small circular cross section.
Figure 4F:
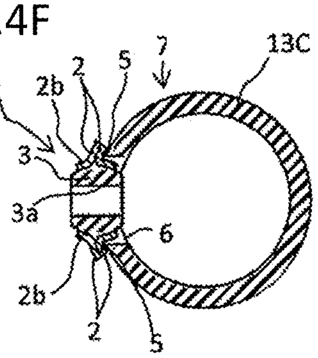

Furthermore, as illustrated in FIGS. 4E and 4F, when nozzle unit 1 of the present embodiment is attached to pipe 13C (fluid flow path) having a circular cross section, nozzle unit 1 can be easily attached by forming flat portion 2*a* of thin plate member 2 in a curved shape according to a curvature of an outer peripheral surface (flow path wall 6) of pipe 13C. Gasket 5 is made of an elastic material, and thus has flexibility. Therefore, gasket 5 can be curved according to the curvature of flow path wall 6 of pipe 13C. In particular, when nozzle unit 1 is disposed such that the direction in which pipe 13C extends is parallel to the long sides of flat portion 2*a* of thin plate member 2 and gasket 5, nozzle unit 1 can be attached by curving the short side of flat portion 2*a* of thin plate member 2. Therefore, it is possible to reduce the amount of curving, so that machining and mounting of nozzle unit 1 may become easy. As described above, nozzle unit 1 can be easily attached to various flow path walls 6 by partially curving thin plate member 2 according to the shape of flow path wall 6 to which nozzle unit 1 is attached.

Flow path body 6 having flow path wall 6 to which nozzle unit 1 of the present invention is attached is not limited to a pipe, and flow path body 6 may be various members such as the housing of a tank-like container. The mounting surface (flow path wall) is not limited to a flat surface, and nozzle unit 1 may be attached to a curved surface as illustrated in FIG. 4F. The reason for this is that in the present invention, the member for holding nozzle body 3 does not have to be a large rigid housing including a three-dimensional mounting space as in Patent Documents 1 and 2, and it may be thin plate member 2 that can be easily curved. When fluid flows out of nozzle device 7, even in a tank-like container and the like, the fluid flows toward fluid passage 3*a* of nozzle unit 1 thereinside, and thus the tank-like container and the like are also regarded as a kind of the flow path body.

Figure 5:
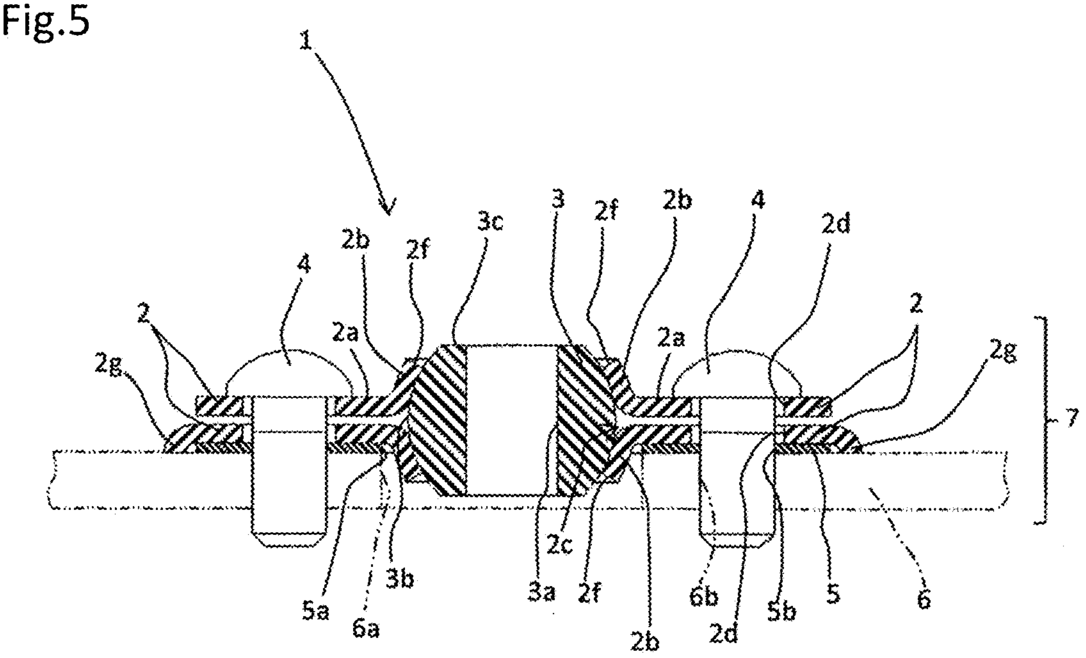
FIG. 5 is a cross-sectional view illustrating a modification of the nozzle device of the first embodiment of the present invention.

FIG. 5 illustrates a modification of nozzle device 7 of the present embodiment. In this modification, the outer peripheral portion of flat portion 2*a* of thin plate member 2 on a side close to flow path wall 6 (for example, a wall surface of the pipe) is bent in a direction toward flow path wall 6 (a direction on an opposite side to the surface on which flat portions 2*a* of thin plate members 2 face each other, that is, the same direction as the direction in which the contact holding portion 2*b* extends). This bent portion 2*g* is located so as to surround the outer peripheral portion of gasket 5 from outside. Therefore, when gasket 5 is pressed to flat portion 2*a* of pair of thin plate members 2 by threading screw 4 into threaded hole 6*b* of flow path wall 6, bent portion 2*g* can prevent compressed gasket 5 from spreading outward and protruding outside the outer peripheral portion of thin plate member 2. Gasket 5 functions to prevent the fluid from leaking from a gap between flat portion 2*a* of thin plate member 2 and wall surface 6 of the pipe. If this gasket 5 is compressed to be so thin as to extend outside of the outer peripheral portion of flat portion 2*a* of thin plate member 2, there is a decrease in the effectiveness of preventing the leakage of fluid. In contrast to this, in the present modification, bent portion 2*g* can prevent gasket 5 from extending outside and can maintain the effect of preventing leakage.

Figure 6:
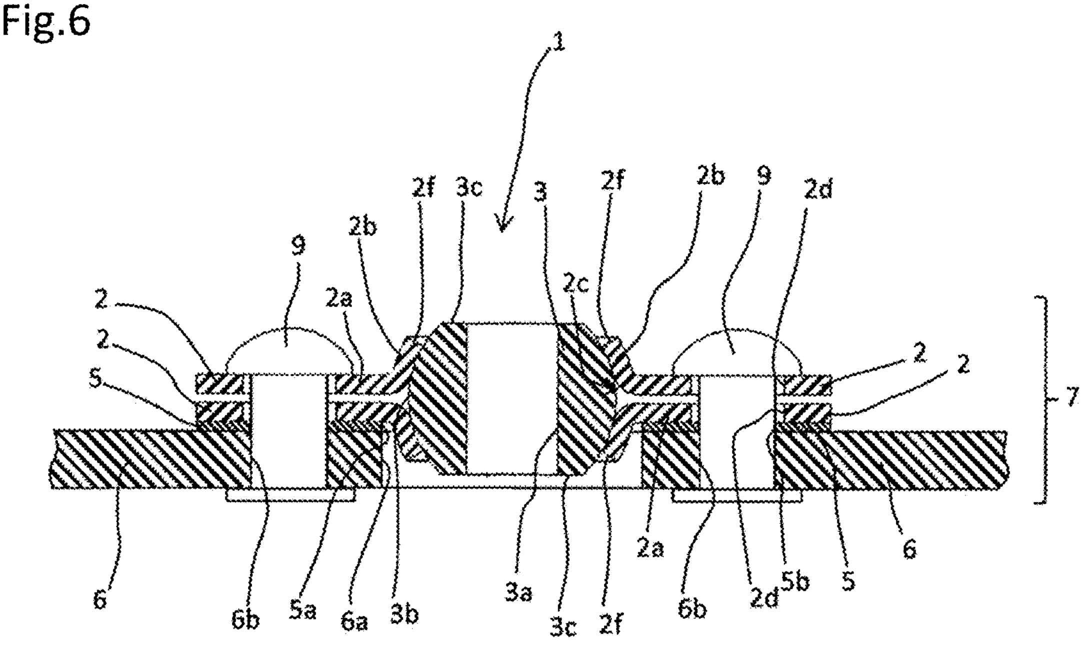
FIG. 6 is a cross-sectional view illustrating another modification of the nozzle device of the first embodiment of the present invention.

The securing member of nozzle unit 1 is not limited to screw 4 illustrated in FIGS. 1A 1B and 2. For example, although not illustrated, a screw with a pointed tip (so-called tapping screw) can also be used as the securing member. In this case, a threaded hole need not be formed in advance in flow path wall 6 such as a wall surface of a pipe. This then reduces processes for machining on flow path wall 6 to which nozzle unit 1 is attached, thereby simplifying the work and expanding the selection range of the flow path body to which nozzle unit 1 is attached. Further, according to the modification illustrated in FIG. 6, rivet 9 can also be used as the securing member. In this case, instead of a threaded hole, a simple through-hole is formed in flow path wall 6. Rivet 9 penetrates through fixing holes 2*d* and 5*b* and the through-hole and is crimped, whereby pair of thin plate members 2 and gasket 5 can be undetachably fixed to flow path wall 6. To crimp rivet 9, a space is required for the operation of pressing a distal end portion of rivet 9 that has passed through the through hole. When screw 4 is used as the securing member as illustrated in FIGS. 1A to 5, the pressure, which is applied to nozzle body 3 by contact holding portions 2*b* to hold nozzle body 3, can be adjusted by the degree of tightening of screw 4. When rivet 9 is used as the securing member as illustrated in FIG. 6, the pressure can be adjusted by the degree of crimping of rivet 9. Contact holding portion 2*b* can be configured not to press nozzle body 3 to hold nozzle body 3.

Figure 7:
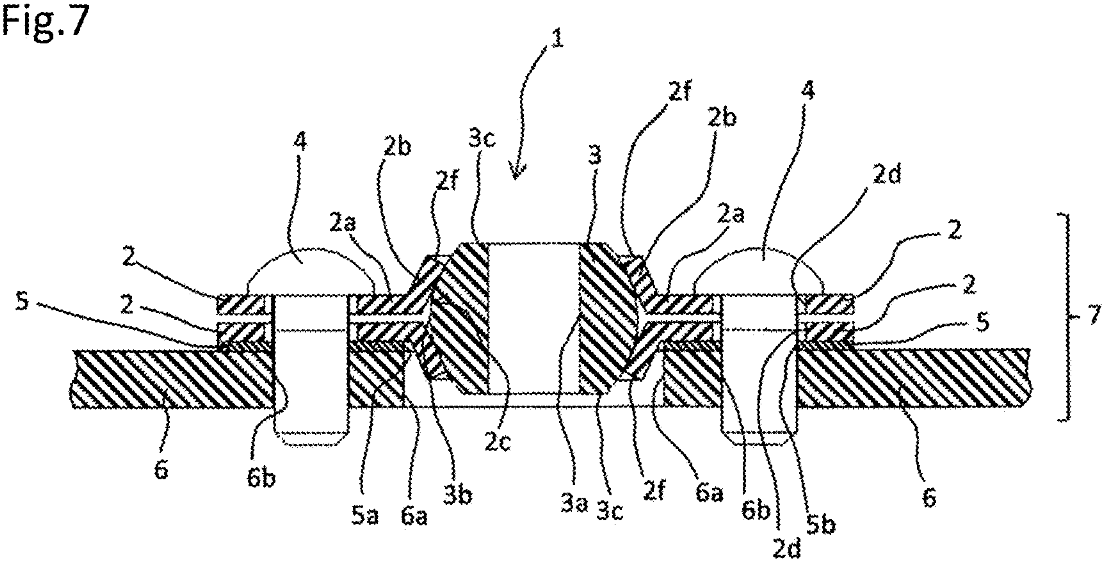
FIG. 7 is a cross-sectional view illustrating still another modification of the nozzle device of the first embodiment of the present invention.

FIG. 7 illustrates another modification of nozzle device 7 of the present embodiment. In this modification, the inner surface and the outer surface of contact holding portion 2*b* are not spherical surfaces, but inclined flat surfaces. In this case, a part of the spherical surface on the outer periphery of nozzle body 3 is not in contact with the inner peripheral surface of contact holding portion 2*b*, which facilitates rotation of nozzle body 3. However, the complicated process of forming the curved surface with high accuracy is not necessary. As a result, the work of forming contact holding portion 2*b* becomes much easier.

Figure 8:
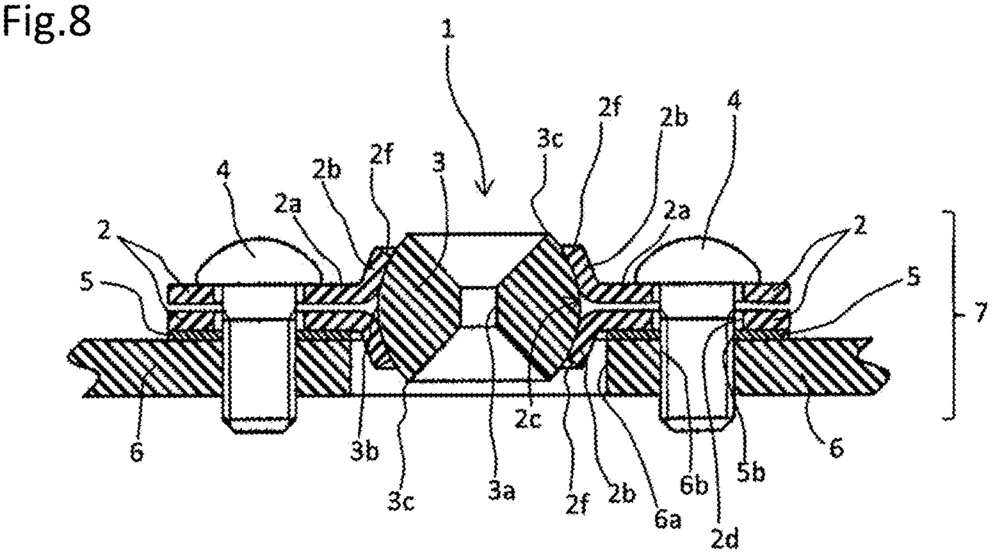
FIG. 8 is a cross-sectional view illustrating further another modification of the nozzle device of the first embodiment of the present invention.

In another modification illustrated in FIG. 8, each fluid passage 3*a* has a continuously expanding shape from a central portion in the longitudinal direction toward both end portions. This structure is suitable for widely and radially ejecting the fluid from nozzle unit 1.

As described above, at a stage before nozzle unit 1 mainly comprising pair of thin plate members 2, nozzle body 3, securing members (screw 4, rivet 9, or the like), and gasket 5 is attached to flow path wall 6 of the flow path body (pipes 13A to 13C and the like), pair of thin plate members 2 and gasket 5 overlap with each other, securing members 4 and 9 penetrate through fixing holes 2*d* and 5*a*, and then the distal end portions of securing members 4 and 9 that penetrate through fixing holes 2*d* and 5*a* are preferably covered, for example, with a resin cap, although this is not illustrated. As a result, it is possible to prevent the person who is handling nozzle unit 1 from being injured by the distal end portions of securing members 4 and 9. Further, the cap acts as a retainer for securing members 4 and 9 and maintains the state in which nozzle unit 1 can be easily carried around without disassembling each member thereof.

Figure 9A:
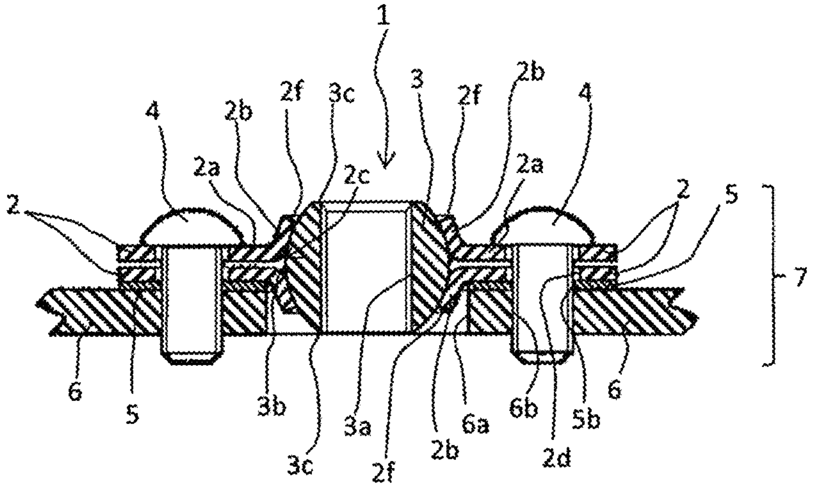
FIG. 9A is a cross-sectional view illustrating a nozzle device of a second embodiment of the present invention.
Figure 9B:
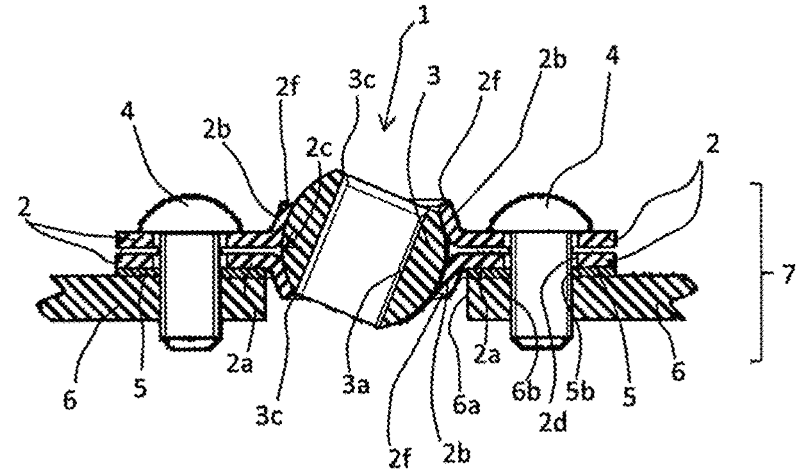
FIG. 9B is a cross-sectional view illustrating a state in which the outflow direction is changed.

FIGS. 9A and 9B illustrate nozzle device 7 of a second embodiment of the present invention. One end portion (upper end portion in FIG. 9A) of nozzle body 3 of the present embodiment has an end surface in which a part of the spherical body is cut off, as in the first embodiment (FIGS. 1A to 8). At the other end portion (lower end portion in FIG. 9A) of nozzle body 3 of the present embodiment, spherical body is not cut off and the spherical shape which has almost no end surface is kept. Fluid passage 3*a* is formed from the one end portion to the other end portion of nozzle body 3. Further, a female thread portion is formed in an inner surface of fluid passage 3*a*. This nozzle body 3 is configured, as in the first embodiment, such that the outer diameter continuously decreases from maximum outer diameter portion 3*b* located substantially at the center in the longitudinal direction of fluid passage 3*a* toward both end portions 3*c* (the above-described one end portion and the other end portion) in the longitudinal direction of fluid passage 3*a*. Specifically, outer diameter D1 of maximum outer diameter portion 3*b* is larger than outer diameter D2 of both end portions 3*c*, smaller than inner diameter d1 of fluid passage 3*a*, and larger than inner diameter d2 of distal end portion 2*f* of hollow portion 2*c* of contact holding portion 2*b* (see FIG. 2). As a result, nozzle body 3, which is inserted into the holding space formed by connecting hollow portions 2*c*, is rotatably held between distal end portions of contact holding portions 2*b* of overlapping both thin plate members 2. This structure simplifies the machining process of forming nozzle body 3.

Figure 10A:
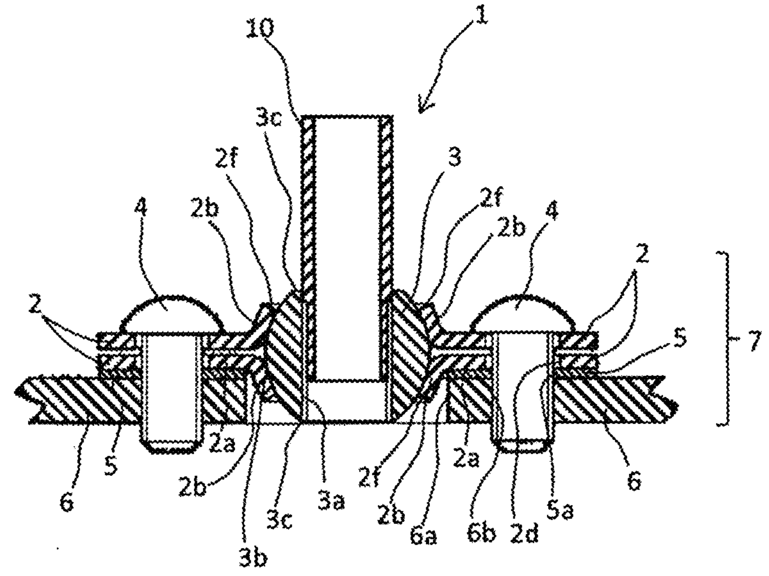
FIG. 10A is a cross-sectional view illustrating an application example of the nozzle device illustrated in FIGS. 9A and 9B.
Figure 10B:
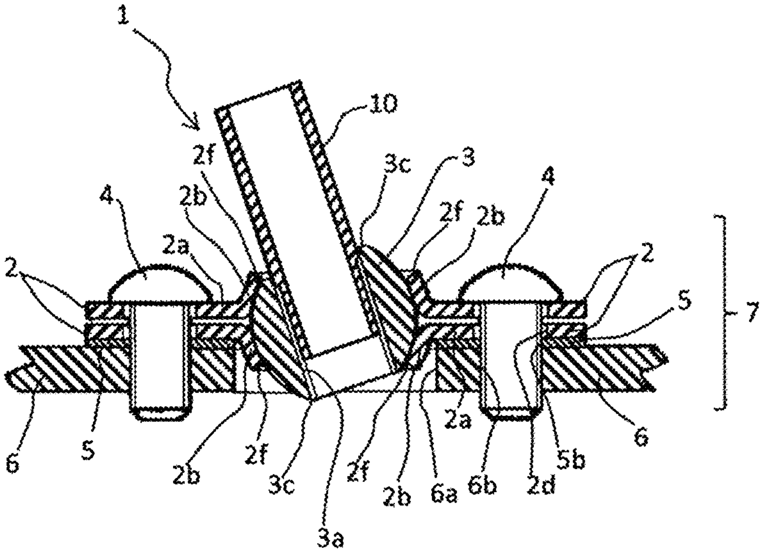
FIG. 10B is a cross-sectional view illustrating a state in which the outflow direction is changed.

FIGS. 10A and 10B illustrate an application example of the present embodiment. As described above, a female thread portion is formed in fluid passage 3*a* of the present embodiment. Hollow pipe member 10 is attached to nozzle body 3, and at least a part of hollow pipe member 10 has a male thread portion to be threaded into the female thread portion. Nozzle unit 1 of the present invention has an advantage in which the dimension in a direction vertical to flow path wall 6 (in the thickness direction of flat portion 2*a* of thin plate member 2) is very small. However, a longer outflow path may be required in order to improve the fluid outflow performance (ejection performance). In this case, as illustrated in FIG. 9A, pair of thin plate members 2 and gasket 5 are attached to flow path wall 6 of the flow path body (wall surface such as a pipe) by the securing member (screw 4 or the like), and then, as illustrated in FIG. 10A, pipe member 10 is attached to nozzle body 3 by threading the male thread portion of pipe member 10 into the female thread portion of fluid passage 3*a*. Pipe member 10 becomes an extension portion of fluid passage 3*a* and configures a long outflow path. As a result, at a stage before attachment of nozzle unit 1 to flow path wall 6 by securing member 4, the dimensions in the thickness direction of pair of thin plate members 2, gasket 5 and nozzle body 3 are kept very small so that it is easy to handle and attach nozzle unit 1. After attachment of nozzle unit 1, the fluid outflow performance (ejection performance), for example, the accuracy of the outflow direction, can be improved by using pipe member 10. Thus, in the state in which pipe member 10 is attached and the outflow path becomes long, as illustrated in FIG. 10B, the fluid outflow direction can be changed by integrally rotating nozzle body 3 and pipe member 10. In this structure, to stop the fluid outflow, instead of pipe member 10, a plug (not shown in the drawings) may be attached to nozzle body 3. At least a part of plug has a male thread portion to be threaded into a female thread portion.

Figure 11A:
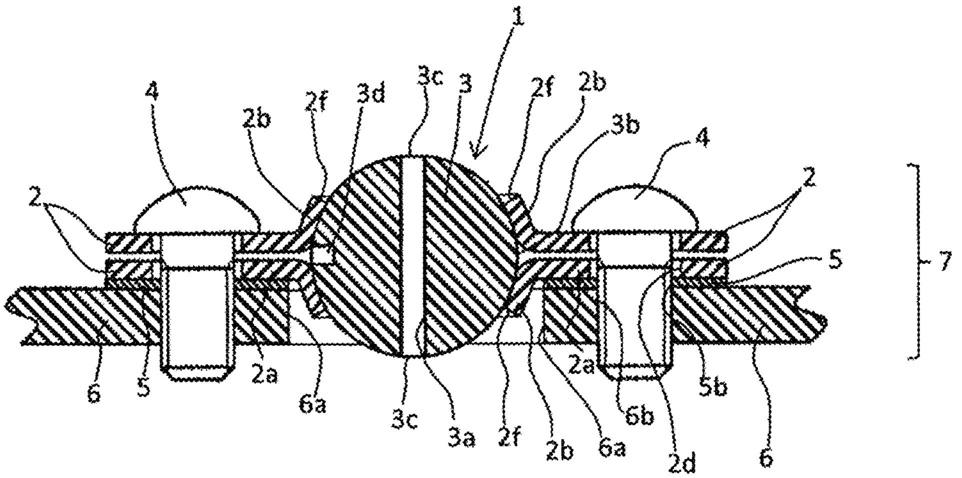
FIG. 11A is a cross-sectional view illustrating a nozzle device of a third embodiment of the present invention.
Figure 11B:
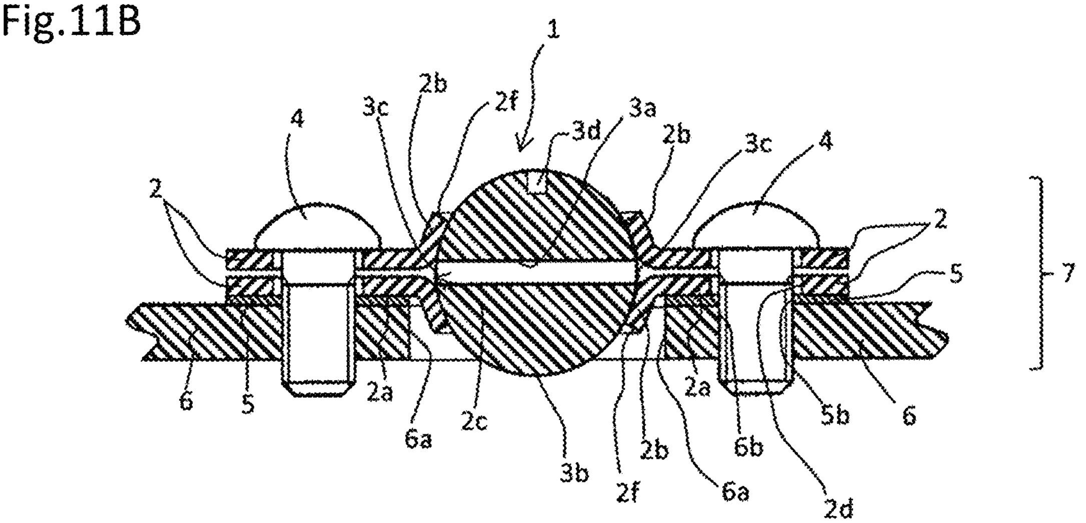
FIG. 11B is a cross-sectional view illustrating an outflow stop state of the nozzle device.

FIGS. 11A and 11B illustrate nozzle device 7 of a third embodiment of the present invention. Nozzle body 3 of the present embodiment has a shape in which fluid passage 3*a* is formed in a spherical body, and the spherical body is not cut off in both end portions 3*c* in the longitudinal direction of fluid passage 3*a*, and nozzle body has almost no end surface in the longitudinal direction. This structure further simplifies the machining process of forming nozzle body 3. This nozzle body 3 is configured, as in the first and second embodiments, such that the outer diameter continuously decreases from maximum outer diameter portion 3*b* located substantially at the center in the longitudinal direction of fluid passage 3*a* toward both end portions 3*c* in the longitudinal direction of fluid passage 3*a*. Specifically, outer diameter D1 of maximum outer diameter portion 3*b* is larger than the outer diameter of both end portions 3*c* (substantially equal to the inner diameter of fluid passage 3*a*), smaller than inner diameter d1 of root portion 2*e* of hollow portion 2*c*, and larger than inner diameter d2 of distal end portion 2*f* (see FIG. 2). As a result, nozzle body 3 inserted into the holding space composed of pair of hollow portion 2*c* is rotatably held between distal end portions 2*f* of contact holding portions 2*b* of overlapping both thin plate members 2. Nozzle body 3 of the present embodiment is a substantially spherical body, and thus can rotate 360 degrees in a plane parallel to flat portion 2*a* of thin plate member 2 and can also rotate substantially 360 degrees in the thickness direction of flat portion 2*a* of thin plate member 2. Notch portion 3*d* (not limited to one portion) is provided on an outer periphery of nozzle body 3. Nozzle body 3 can be easily rotated by hooking a tool (not illustrated) or the like in this notch portion 3*d*. As described above, in the present embodiment, nozzle body 3 has a very high degree of freedom of rotation and can be almost freely rotated. In this structure, to stop the fluid outflow, as illustrated in FIG. 11B, nozzle unit may be rotated such that fluid passage 3*a* may be parallel to a plate surface of flat portion 2*a* of thin plate member 2 and that both end portions of fluid passage 3*a* may be covered with contact holding portion 2*a*. This structure prevents nozzle body 3 from being detached from between the pair of contact holding portions 2*a*.

Figure 12:
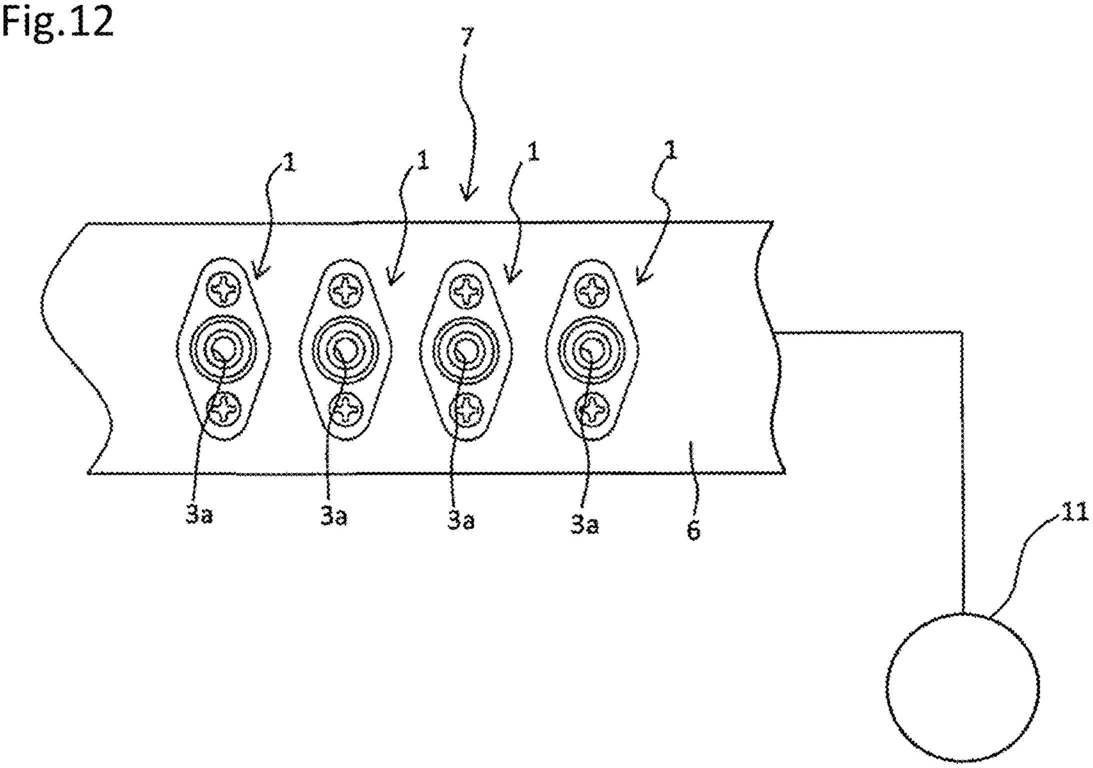
FIG. 12 is a schematic view illustrating a fluid outflow mechanism including the nozzle device of the present invention.

As illustrated in FIG. 12, nozzle unit 1 of each embodiment described above can be attached to flow path wall 6 of pipes (flow path body) constituting the piping, thereby configuring nozzle device 7. Pump 11 for generating a pressure to eject the fluid is connected to this flow path body. For example, in a machine tool, nozzle device 7 can easily supply a liquid coolant toward a tool for machining and a machined portion of a workpiece. One outflow portion may be configured by attaching one nozzle unit 1 to one pipe. However, as illustrated in FIG. 12, a plurality of nozzle units 1 may also be attached to one flow path wall 6 (pipe), thereby configuring a plurality of outflow portions and simultaneously supplying a fluid (for example, coolant) to a plurality of places. Further, although not illustrated, a plurality of nozzle units 1 may also be attached to a wall surface of flow path wall 6 (container) containing the liquid, thereby forming an outflow mechanism for ejecting the liquid directly from the container.

Figure 13A:
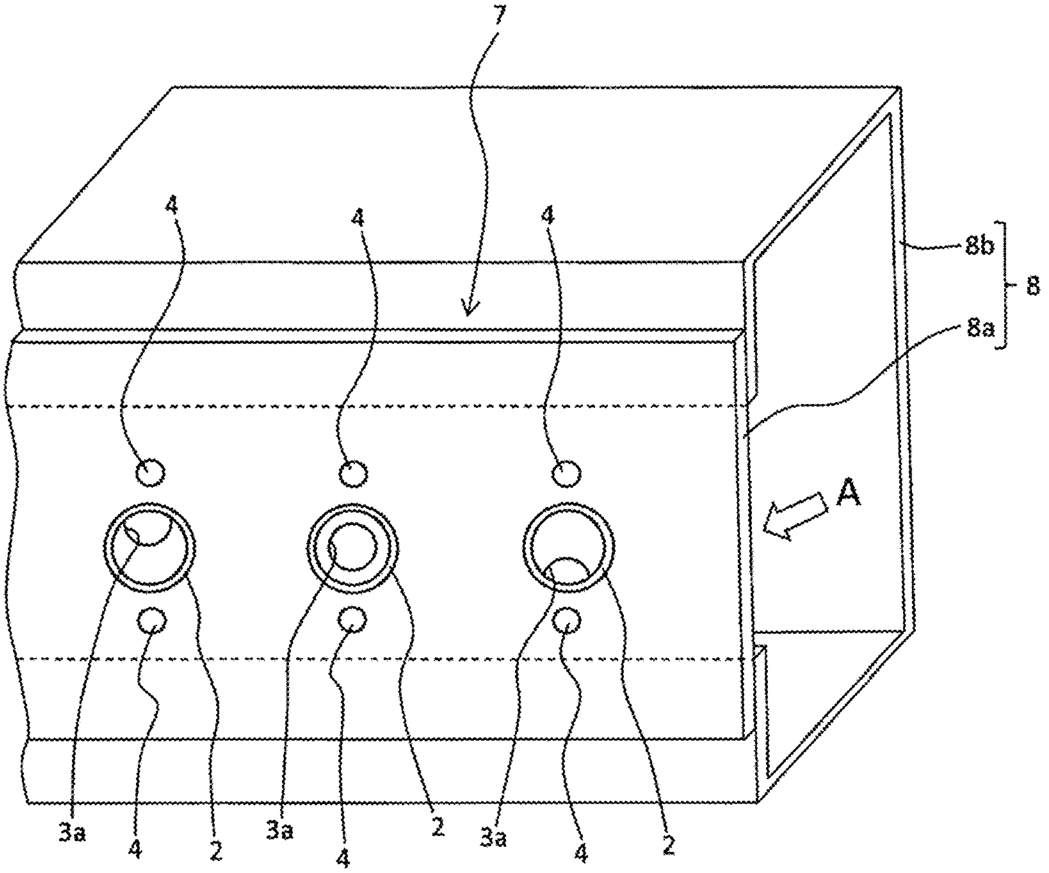
FIG. 13A is a perspective view illustrating a nozzle device of a fourth embodiment of the present invention.
Figure 13B:
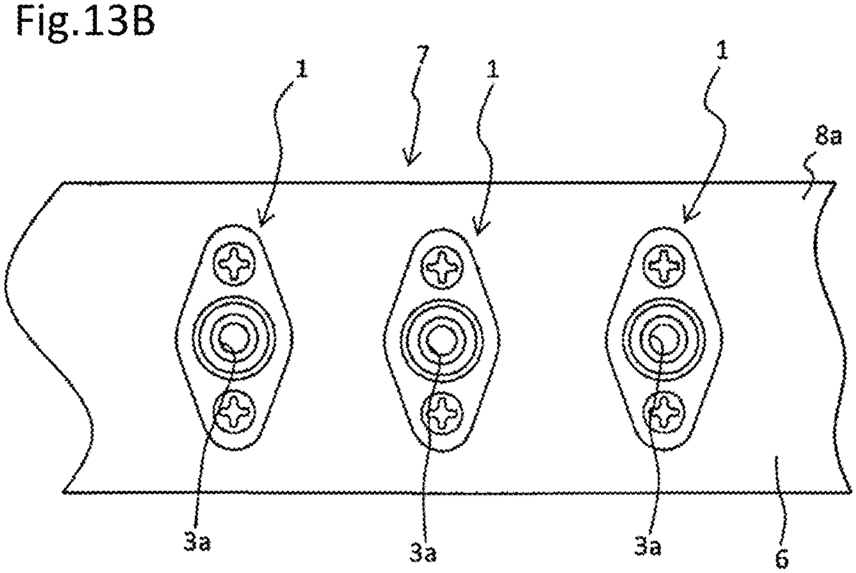
FIG. 13B is a rear view illustrating the flow path wall with the nozzle unit attached thereto of a fourth embodiment of the present invention.

FIGS. 13A and 13B illustrates nozzle device 7 of a fourth embodiment of the present invention. FIG. 13A is a perspective view of nozzle device 7 of the present embodiment. FIG. 13B is a rear view illustrating a surface, which faces inward of flow path body 8, of flow path wall 8*a* of flow path body 8 of nozzle device 7 of the present embodiment as viewed in the direction of arrow A. In flow path body 8 of the present embodiment, one flow path wall 8*a* is not integral with the other portion (main body portion 8*b*), but is formed as a separate member. A plurality of nozzle units 1 are attached to flow path wall 8*a* that is this separate member. At this time, nozzle unit 1 is attached to the inner surface of flow path wall 8*a* (surface facing inward of flow path body 8). Therefore, when this flow path body 8 is viewed from outside, except for fluid passages 3*a* exposed from the hole portions of flow path wall 8*a* and except for the distal end portions of screws 4 (securing members) exposed from the fixing holes, most portions of nozzle unit 1 are covered and hidden by flow path wall 8*a*. In other words, in a state of being hardly visible from outside except for fluid passage 3*a* and without impairing the appearance, nozzle unit 1 has the advantage of enabling the liquid to flow out and has the advantage of freely changing the outflow direction as in each of the above-described embodiments. FIGS. 13A and 13B illustrates nozzle device 7 comprising three nozzle units 1, wherein each of three nozzle units 1 have different fluid outflow directions from each other, as indicated by the opening direction of fluid passage 3*a*. If rivet 9 similar to that illustrated in FIG. 6 is used as the securing member, rivet 9 can be lightly crimped to adjust the distance between thin plate member 2 and the flow path wall and to adjust the pressure applied to the nozzle body.

According to the present embodiment, nozzle unit 1 is attached to flow path wall 8*a* that is one plate member before being joined to main body portion 8*b* of flow path body 8. Then, flow path wall 8*a* having nozzle unit 1 attached thereto is joined to main body portion 8*b* to configure flow path body 8, which completes nozzle device 7. This method can easily attach nozzle unit 1 to the surface inside flow path wall 8*a* as illustrated in FIGS. 13A and 13B. Thus, according to this method, the operation (especially the mounting operation of nozzle unit 1) is much easier than the method of attaching nozzle unit 1 to the completed pipe-like or container-like flow path body.

Figure 14:
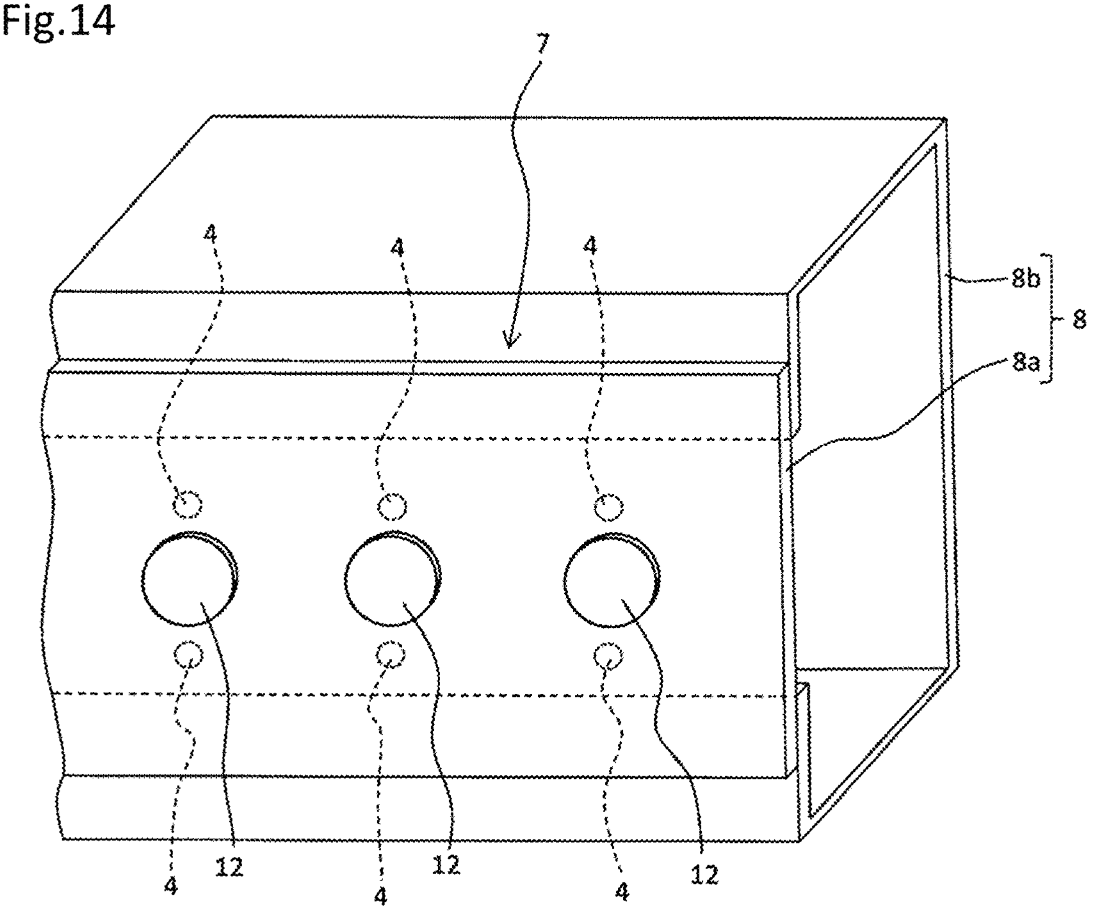
FIG. 14 is a cross-sectional view illustrating a modification of the nozzle device of the fourth embodiment of the present invention.

In the present embodiment, when the fixing hole is formed not as a through-hole but as a bottomed hole which is opened only in an inner surface of the flow path wall, screw 4 can reach only a middle portion of flow path wall 8*a* in its plate thickness direction, as illustrated in FIG. 14. The distal end portion of screw 4 is invisible from outside, and nothing is visible except for fluid passage 3*a* that is a hole through which the fluid flows out. Therefore, the effects of the present invention can be obtained without impairing the appearance. Further, in the present embodiment, when the fluid should not flow out, plug 12 for closing fluid passage 3*a* can be attached as illustrated in FIG. 14. As in the structure illustrated in FIGS. 9A and 9B, when a female thread portion is preliminarily formed in the fluid passage, plug 12 having a male thread portion can be used to thread the male thread portion into the female thread portion, thereby fixing plug 12 to fluid passage 3*a*, in order to prevent the fluid from flowing out. Alternatively, when the fluid should not flow out, fluid passage 3*a* may also be blocked by contact holding portion 2*b* so as not to be exposed as in the state illustrated in FIG. 11B.

Thin plate member 2, nozzle body 3 and securing member (screw 4, rivet 9, and the like) constituting nozzle unit 1 of the present invention may be made of metal or resin. Pipe member 10 illustrated in FIGS. 10A and 10B may also be made of metal or resin. However, these members may be made of a material other than metal and resin. Gasket 5 is preferably made of an elastic resin material. The unillustrated cap is also preferably made of resin. However, the gasket and the cap may be made of a material other than resin (for example, metal).

As described above, the present invention can provide nozzle unit 1 and nozzle device 7 that are very compact, especially very small in the thickness direction (direction vertical to flow path walls 6 and 8*a*), and can be reduced in weight. As a result, flow path walls 6 and 8*a* (nozzle attachment portions of the piping and the housing) of the flow path body do not require large space and high strength, and thus this extremely reduces restrictions on the attachment position. Further, this nozzle unit 1 can change the direction of fluid passage 3*a* in an easy and relatively free manner, and the outflow position and the outflow direction of the fluid can be set arbitrarily. Furthermore, the operation of accommodating nozzle body 3 between pair of thin plate members 2 is very easy, and thus the manufacturing process of nozzle device 7 is extremely simple as compared to the invention described in Patent Document 1 which requires the pressing of the spherical body into the housing. Nozzle unit 1 of the present invention can be very easily attached and detached. When screw 4 is used as the securing member, there is no need to use a spanner or the like, and nozzle unit 1 can be fixed by one screwdriver, thereby requiring a small work space for attachment. As in the inventions described in Patent Documents 1 and 2, when a part of the nozzle housing itself constitutes the male thread portion, the attached nozzle forms a protrusion greatly protruding outward from the wall surface (attachment portion) of an external member such as a pipe. However, nozzle unit 1 of the present invention has a very small amount of protrusion outward from flow path walls 6 and 8*a*, which is not so noticeable and is not impeditive.

EXPLANATION OF REFERENCE NUMERALS

1 nozzle
2 thin plate member
2*a* flat portion
2*b* contact holding portion
2*c* hollow portion
2*d* fixing hole
2*e* root portion
2*f* distal end portion
3 nozzle body
3*a* fluid passage
3*b* maximum outer diameter portion
3*c* end portion
4 screw (securing member)
5 gasket
5*a* central hole
5*b* fixing hole
6 flow path wall
6*a* hole portion
6*b* threaded hole
7 nozzle device
8 flow path body
8*a* flow path wall
8*b* main body portion
9 rivet (securing member)
10 pipe member
11 pump
12 plug
13A, 13B, 13D pipe (flow path body)

The invention claimed is:

1. A nozzle device comprising:

a flow path body that flows or holds a fluid and that has a flow path wall, the flow path body comprises either a pipe in which the fluid flows along the flow path wall or a container in which the fluid is held; and a nozzle unit directly attached to the flow path wall including a nozzle body having a spherical surface on an outer periphery thereof and having a fluid passage formed thereinside, a holding mechanism of said nozzle body, and a securing member that fixes said holding mechanism to said flow path wall, wherein said holding mechanism is made of a pair of thin plate members, each having a contact holding portion in contact with said spherical surface of said nozzle body and having a flat portion, and said holding mechanism rotatably holds said spherical surface in a state in which said nozzle body is sandwiched by said contact holding portions of said pair of thin plate members.

2. The nozzle device according to claim 1, wherein said contact holding portion has a shape bent from said flat portion, the shape having a hollow portion that is tapered away from said flat portion.

3. The nozzle device according to claim 2, wherein said nozzle body is held in a holding space formed by connecting said hollow portions of said contact holding portions of said pair of thin plate members.

4. The nozzle device according to claim 1, further comprising a gasket disposed between thin plate member and said flow path wall.

5. The nozzle device according to claim 1, wherein said securing member is a screw fixed to said flow path wall.

6. The nozzle device according to claim 5, wherein the screw is a tapping screw.

7. The nozzle device according to claim 1, wherein said securing member is a rivet crimped to said flow path wall.

8. The nozzle device according to claim 1, wherein said nozzle body has a shape in which said fluid passage is formed into a through-hole shape in a spherical body.

9. The nozzle device according to claim 1, wherein a pipe member that becomes an extension portion of said fluid passage is attached to said fluid passage of said nozzle body.

10. The nozzle device according to claim 1, wherein at least one member of said pair of thin plate members is partially curved according to a shape of said flow path wall.

11. The nozzle device according to claim 1, wherein in a state in which said securing member fixes said holding mechanism to said flow path wall, said contact holding portions of said pair of thin plate members press and hold said nozzle body therebetween.

12. The nozzle device according to claim 1, wherein said nozzle unit is attached to a surface facing inward of said flow path body of said flow path wall.

13. The nozzle device according to claim 1, wherein said flow path wall is attachable to and detachable from a main body portion of said flow path body.

* * * * *